(12) United States Patent
Vegas et al.

(10) Patent No.: US 12,375,926 B2
(45) Date of Patent: Jul. 29, 2025

(54) CLIENT MAC SOURCE ADDRESS RANDOMIZATION BY MESH NODES IN WIRELESS MESH NETWORKS

(71) Applicant: Cisco Technology, Inc., San Jose, CA (US)

(72) Inventors: Thomas Vegas, Vaud (CH); Anirban Karmakar, Vaud (CH); Robert E. Barton, Richmond (CA); Jerome Henry, Pittsboro, NC (US); Amine Choukir, Ecublens (CH); Domenico Ficara, Vaud (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 518 days.

(21) Appl. No.: 17/673,464

(22) Filed: Feb. 16, 2022

(65) Prior Publication Data
US 2023/0262464 A1    Aug. 17, 2023

(51) Int. Cl.
| | |
|---|---|
| *H04W 12/02* | (2009.01) |
| *H04W 12/03* | (2021.01) |
| *H04W 12/041* | (2021.01) |
| *H04W 12/0471* | (2021.01) |
| *H04W 12/122* | (2021.01) |

(52) U.S. Cl.
CPC ......... *H04W 12/122* (2021.01); *H04W 12/03* (2021.01); *H04W 12/041* (2021.01); *H04W 12/0471* (2021.01)

(58) Field of Classification Search
CPC ............... H04W 12/122; H04W 12/03; H04W 12/041; H04W 12/02
See application file for complete search history.

(56) References Cited

U.S. PATENT DOCUMENTS

| | | | |
|---|---|---|---|
| 7,706,539 B2 * | 4/2010 | Jang | H04W 12/02 |
| | | | 380/278 |
| 8,769,257 B2 | 7/2014 | Sood | |
| 9,143,482 B1 | 9/2015 | Breau et al. | |
| 9,363,736 B2 | 6/2016 | Griot et al. | |
| 9,980,133 B2 | 5/2018 | Barrett et al. | |

(Continued)

FOREIGN PATENT DOCUMENTS

| | | |
|---|---|---|
| WO | 2018/045590 A1 | 3/2018 |
| WO | 2018/162791 A1 | 9/2018 |

*Primary Examiner* — Khang Do
(74) *Attorney, Agent, or Firm* — Edell, Shapiro & Finnan, LLC

(57) ABSTRACT

A method is performed at a mesh access point (MAP) of a mesh network in which MAPs are configured to communicate with each other over wireless backhaul links. The method includes: receiving, from a first wireless client having a first client address, client traffic destined for a second wireless client having a second client address, the client traffic including a first source address that represents the first client address, and a first destination address that represents the second client address; generating a first obfuscated source address that differs from the first client address; replacing the first source address in the client traffic with the first obfuscated source address; and transmitting the client traffic with the first obfuscated source address in place of the first source address to a next MAP of the MAPs over a wireless backhaul link for subsequent forwarding to the second wireless client.

20 Claims, 7 Drawing Sheets

(56) References Cited

U.S. PATENT DOCUMENTS

| | | | |
|---|---|---|---|
| 11,665,129 B2 * | 5/2023 | Desmouceaux | H04L 61/2503 370/230 |
| 11,729,139 B2 * | 8/2023 | Kobo | G06F 9/45558 |
| 11,757,930 B2 * | 9/2023 | Konda | H04L 63/1458 |
| 11,784,786 B2 * | 10/2023 | Deutsch | H04L 9/3242 711/163 |
| 11,825,018 B1 * | 11/2023 | Salour | H04M 3/54 |
| 2008/0222315 A1 | 9/2008 | Maszak et al. | |
| 2008/0291862 A1 * | 11/2008 | Lu | H04W 40/246 370/312 |
| 2009/0169011 A1 * | 7/2009 | Zhao | H04W 12/069 380/277 |
| 2009/0232026 A1 * | 9/2009 | Lu | H04W 40/12 370/254 |
| 2010/0260146 A1 * | 10/2010 | Lu | H04L 12/4641 455/432.1 |
| 2011/0058549 A1 * | 3/2011 | Harel | H04L 47/31 370/390 |
| 2011/0103394 A1 * | 5/2011 | Vogt | H04L 61/2557 370/401 |
| 2012/0076072 A1 | 3/2012 | Jalfon et al. | |
| 2014/0036807 A1 | 2/2014 | Huang et al. | |
| 2015/0223160 A1 | 8/2015 | Ho et al. | |
| 2016/0135041 A1 * | 5/2016 | Lee | H04L 45/745 726/3 |
| 2016/0135053 A1 * | 5/2016 | Lee | H04W 12/02 726/7 |
| 2016/0285834 A1 * | 9/2016 | Lee | H04L 69/22 |
| 2017/0272368 A1 | 9/2017 | Mestanov et al. | |
| 2018/0041930 A1 | 2/2018 | Hampel et al. | |
| 2021/0100050 A1 | 4/2021 | Ho et al. | |
| 2021/0266316 A1 | 8/2021 | Gundavelli et al. | |
| 2023/0089319 A1 * | 3/2023 | Kneckt | H04W 12/037 |
| 2023/0146079 A1 * | 5/2023 | Jeng | H04L 61/106 726/26 |
| 2023/0147562 A1 * | 5/2023 | Kneckt | H04W 12/04 380/270 |
| 2023/0353493 A1 * | 11/2023 | Zhang | H04L 47/12 |
| 2024/0022945 A1 * | 1/2024 | Henry | H04L 61/25 |
| 2024/0114013 A1 * | 4/2024 | Zhou | H04L 63/164 |
| 2024/0155335 A1 * | 5/2024 | de la Oliva | H04W 12/71 |

* cited by examiner

CLIENT MAC SOURCE ADDRESS RANDOMIZATION BY MESH NODES IN WIRELESS MESH NETWORKS

TECHNICAL FIELD

The present disclosure relates to client traffic protection in wireless mesh networks.

BACKGROUND

Media access control (MAC) addresses can be used to identify and track a given wireless client device (referred to as a "wireless client"). Because this leads to privacy issues, the technique of randomized and changing MAC (RCM) addresses has been introduced to mitigate the privacy concern. Using RCM, a wireless client periodically rotates its MAC address to prevent correlation of a single MAC address to the wireless client over time and across different locations. Sometimes, a wireless client is unable to rotate its MAC address or does not rotate its MAC address frequently. In such cases, the wireless client can potentially be tracked based on its static MAC address. The problem is exacerbated in a wireless mesh network, which includes mesh access points (MAPs) that communicate with each other over exposed wireless/radio backhaul links. MAP-to-MAP communications over the backhaul links employ backhaul frames to relay client traffic. The backhaul frames may be encapsulated with a four-address MAC header in which one of the addresses (either the source or destination address, depending on direction of traffic flow) is a "client MAC address" of a wireless client connected to the mesh network. The four-address MAC header is not (and cannot be) encrypted. Thus, an observer of communications on the backhaul links can track the client MAC address as client traffic flows through the mesh network. In addition, the observer can track a path of the client traffic in the mesh network, thus potentially enabling an attacker to disrupt the client traffic by selectively attacking unprotected MAPs along the path, or to capture the client traffic at selected transit points.

DESCRIPTION OF EXAMPLE EMBODIMENTS

Overview

In an embodiment, a method is performed at a mesh access point (MAP) among MAPs of a mesh network in which the MAPs are configured to communicate with each other over wireless backhaul links. The method includes: receiving, from a first wireless client having a first client address, client traffic destined for a second wireless client having a second client address, the client traffic including a first source address that represents the first client address, and a first destination address that represents the second client address; generating a first obfuscated source address that differs from the first client address; replacing the first source address in the client traffic with the first obfuscated source address to obfuscate the first client address of the first wireless client in the client traffic; and transmitting the client traffic with the first obfuscated source address in place of the first source address to a next MAP of the MAPs over a wireless backhaul link for subsequent forwarding to the second wireless client.

Example Embodiments

Figure 1:
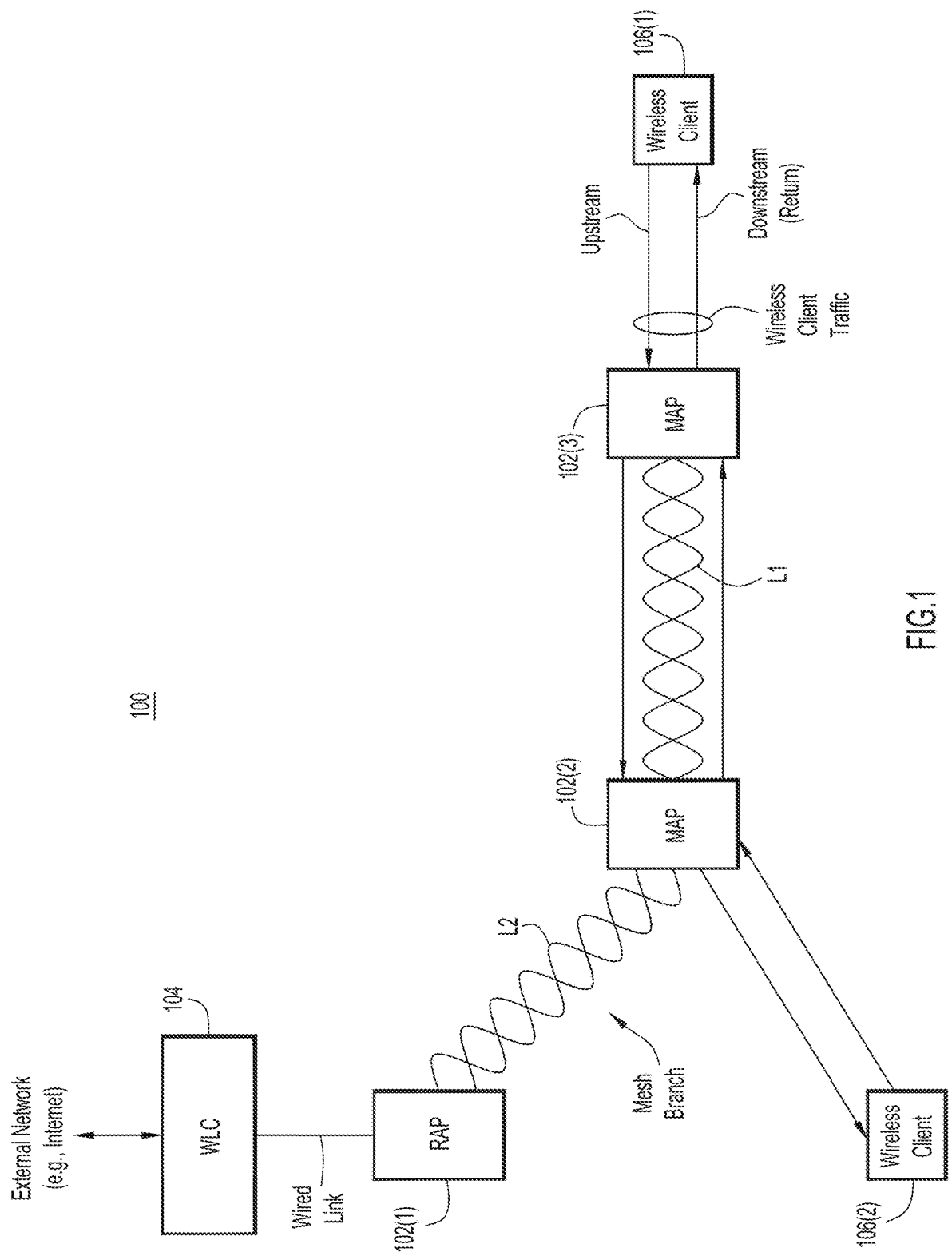
FIG. 1 is a block diagram of a wireless mesh network (also referred to simply as a "mesh network") in which obfuscation of a client MAC address on backhaul links of the mesh network may be implemented, accordance to an example embodiment.

Referring first to FIG. 1, there is shown a block diagram of an example wireless mesh network 100 (also referred to simply as a "mesh network 100") in which obfuscation of a client MAC address on backhaul links of the mesh network may be implemented. Mesh network 100 includes wireless access points (APs) 102(1)-102(3) (each designated as either a "MAP" or a "RAP" in FIG. 1, and also collectively referred to as "APs") connected to each other through wireless backhaul links or channels L1 and L2 (collectively referred to as "backhaul links L"), a wireless local area network (WLAN) controller (WLC) 104, and wireless clients 106(1) and 106(2) (collectively referred to as "wireless clients") served by the mesh network. In practice, a wireless mesh network may include more or less APs than are shown by way of example in FIG. 1. Each AP 102(i) is configured as either a root AP (RAP) or a mesh AP (MAP) depending on its position, connections, and function in mesh network 100, as described herein. WLC 104 is connected to an external network, which may include a wide area network (WAN), such as the Internet.

RAP 102(1) has a wired connection to WLC 104, and MAPs 102(2) and 102(3) communicate with each other and back to the RAP through respective backhaul links L2 and L1. In this way, RAP 102(1) and MAPs 102(2) and 102(3) establish hierarchical, i.e., parent-child or ascendant-descendent, relationships with each other over backhaul links L. For example, RAP 102(1) is a parent of MAP 102(2), which is a parent of MAP 102(3), and so on. The hierarchical topology including RAP 102(1) and MAPs 102(2) and 102(3) form a "branch" of mesh network 100, which may include one or more additional parallel branches, not shown.

Wireless clients 106(1) and 106(2) connect or "associate" to mesh network 100 through respective MAPs 102(3) and 102(2). Once connected to mesh network 100, wireless clients 106(1) and 106(2) send wireless client traffic (e.g., data packets) to mesh network 100, and receive wireless client traffic from the mesh network. MAPs 102(2) and 102(3) (and their backhaul links L) serve as respective "MAP hops" for forwarding the wireless client traffic across mesh network 100. Communications between the MAPs over backhaul links L and between the wireless clients and the MAPs may operate in accordance with various IEEE 802.11 protocols. In another example, wireless clients 106(1) and 106(2) may have wired connections, e.g., Ethernet connections, to their corresponding APs, and originate and receive client traffic over their wired connections.

WLC 104 provides centralized control over mesh network 100 including control over APs 102(1)-102(3). In addition, WLC 104 routes traffic associated with APs 102(1)-102(3) to and from the external network. Such traffic includes data packets transmitted by wireless clients 106(1) and 106(2) and destined for the Internet, or data packets from the Internet destined for the wireless clients, for example. A control and provisioning of wireless access points (CAP-WAP) protocol may be used between each of APs 102(1)-102(3) and WLC 104 to enable the WLC to perform the aforementioned mesh network control and AP traffic routing functions.

As mentioned above, wireless clients 106(1) and 106(2) may exchange wireless client traffic (referred to simply as "client traffic") with each other over mesh network 100. For example, wireless client 106(1) (acting as a "source") may send "upstream" or "uplink" client traffic to wireless client 106(2) (acting as a "destination") over mesh network 100. In reverse, wireless client 106(2) (acting as a "source") may send "downstream" or "return" client traffic to wireless client 106(1) (acting as a "destination") over mesh network 100. In either direction, the client traffic includes a MAC source address (equivalently referred to as a "source MAC address") representative of the device/client MAC address of the source wireless client, and a MAC destination address (equivalently referred to as a "destination MAC address") representative of the device/client MAC address of the destination wireless client.

In a conventional mesh network, when the first hop MAP (e.g., MAP 102(3)) to which the wireless client is directly connected receives the client traffic, the MAP encapsulates the client traffic with an address header (e.g., a four-address MAC header) to produce a backhaul frame. The four-address MAC header includes the MAC source address (SA), the MAC destination address (DA), a MAC transmitter address (TA) (e.g., for a MAP), and a MAC receiver address (RA) (e.g., for a MAP). That is, the following MAC addresses SA, DA, TA, and RA populate respective fields of the backhaul frame. Based on the MAC destination address, the MAP transmits the backhaul frame (encapsulating the client traffic) to a next hop MAP (e.g., MAP 102(2)) over a backhaul link (e.g., backhaul link L1). In turn, the next hop MAP transmits a backhaul frame to a next hop MAP toward the destination, and so on.

The backhaul frame(s) transiting the backhaul link(s) are visible to observers. Thus, the MAC source address is observable and therefore susceptible to rogue devices. Such susceptibility is exacerbated when the wireless client either does not rotate its MAC address (which is presented as the MAC source address on the backhaul links), or rotates its MAC address infrequently. Accordingly, in embodiments presented herein, mesh network 100 obfuscates (i.e., obscures or hides) the MAC source address in the client traffic as it is transmitted, from MAP-to-MAP (i.e., hop-to-hop) over the backhaul links of the mesh network, to and from wireless clients connected to the mesh network. The embodiments hide the MAC source address, which hides the MAC client address, but do not change the MAC client address.

In an embodiment, the MAPs (e.g., MAPs 102(2) and 102(3)) may obfuscate the MAC source address used for a wireless client under control of WLC 104. For example, WLC 104 may monitor an RCM status of each of the wireless clients attached to mesh network 100. When the monitoring indicates that a given wireless client has maintained a static MAC address (used as a source MAC address when the wireless client originates client traffic) for longer than a predetermined time, WLC 104 may determine that the MAC address of the wireless client should be obfuscated on backhaul links L of mesh network 100. Upon determining that the MAC address should be obfuscated, WLC 104 configures one or more of the MAPs to obfuscate the MAC address on their corresponding backhaul links. For example, WLC 104 may send an "obfuscate client MAC address" command to each of the MAPs. Responsive to the command, the MAPs configure themselves to obfuscate the corresponding MAC source address in client traffic. To do this, when each MAP receives client traffic including a MAC source address (that is or represents the client MAC address), the MAP performs an address translation of the MAC source address to a randomized MAC source address, replaces the MAC source address with the randomized MAC source address in a backhaul frame, and transmits the backhaul frame over a backhaul link. In another embodiment, each of the MAPs, rather than WLC 104, may make the determination as to whether the MAC source address should be rotated.

Various embodiments used by mesh network 100 to obfuscate a MAC source address are now described in connection with FIGS. 2-5.

Figure 2:
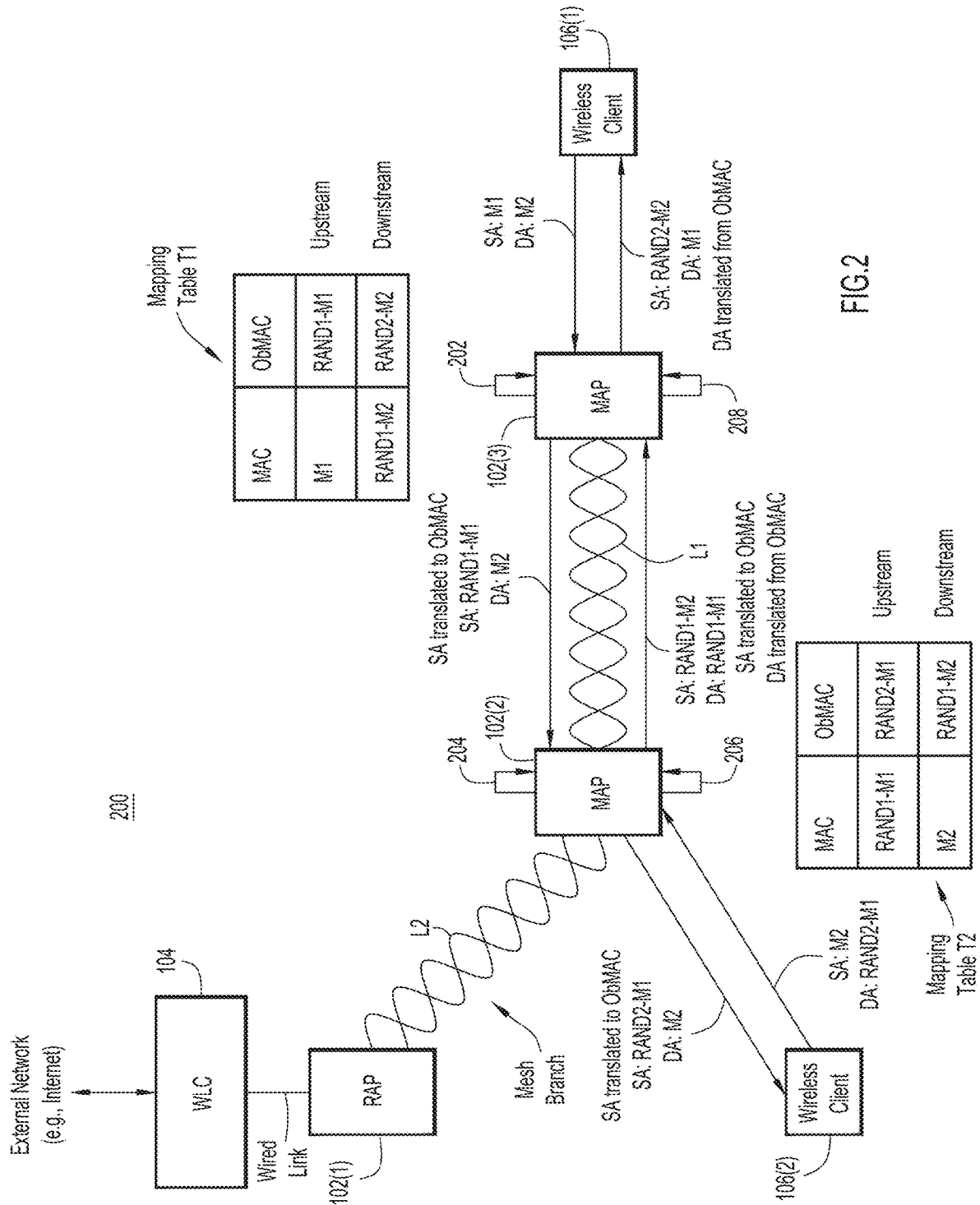
FIG. 2 is an illustration of a method of hop-by-hop randomization of a client MAC (source) address using mapping tables, performed in the mesh network, according to an example embodiment.

An embodiment referred to as "hop-by-hop randomization of a client MAC source address using mapping tables" is described first in connection with FIG. 2. More specifically, FIG. 2 is an illustration of a method 200 of hop-by-hop randomization of a client MAC source address using mapping tables, performed in mesh network 100. Method 200 assumes that MAPs 102(2) and 102(3) are configured to obfuscate MAC source addresses, and that wireless clients 106(1) and 106(2) are configured with device/client MAC address M1 and M2, respectively.

Obfuscation of a MAC source address for client traffic propagating in the upstream direction (i.e., upstream client traffic) is described first. Wireless client 106(1) transmits the client traffic directly to MAP 102(3), which represents a first hop MAP or an incoming MAP of mesh network 100 to which wireless client 106(1) is attached. The client traffic includes MAC source address M1 (i.e., the client MAC address of wireless client 106(1)), and MAC destination address M2 (i.e., the client MAC address of wireless client 106(2)).

Upon receiving the (ingress) client traffic directly from wireless client 106(1), at 202, MAP 102(3) generates a random MAC source address RAND-M1 for/to replace MAC source address M1 along the backhaul links. In other words, MAP 102(3) performs a network address translation (NAT) of (ingress) MAC source address M1 to a random MAC source address RAND1-M1, more generally referred to herein as an "obfuscated MAC (ObMAC) address" or an "ObMAC source address." MAP 102(3) may use any known or hereafter developed address randomization technique to generate the random MAC source address. MAP 102(3) can verify that the random MAC source address (i.e., the ObMAC source address) is not already in use using an inverse address resolution protocol (ARP) mechanism, or using another technique. In another embodiment WLC 104 and the MAPs (e.g., MAPs 102(2) and 102(3)), or the MAPs themselves, can coordinate for an allocation of an extended local identifier (ELI) as the random MAC source address, as described in IEEE 802.1CQ, MAC address pools to prevent collisions, for example.

MAP 102(3) maintains a dynamic mapping table T1 having entries for mappings of MAC source addresses (from ingress traffic) to their corresponding ObMAC source addresses (for egress traffic). After the source address randomization, MAP 102(3) stores an upstream mapping of MAC source addresses M1-to-(RAND1-M1) in a first entry of mapping table T1. MAP 102(3) replaces MAC source address M1 carried in the (ingress) client traffic with the ObMAC source address RAND1-M1, to create a backhaul frame for egress that includes the following MAC addresses:
  a. SA=RAND1-M1 (the ObMAC source address used to obfuscate SA=M1).
  b. DA=M2.
  c. TA=MAP address (e.g., for MAP 102(3)).
  d. RA=MAP address (e.g., for MAP 102(2)).

Based on MAC destination address M2, MAP 102(3) transmits the backhaul frame (as an egress frame), with its MAC source address set to the ObMAC source address RAND1-M1 in place of MAC source address M1, to MAP 102(2) over backhaul link L1. In the backhaul frame, ObMAC source address RAND1-M1 represents but obfuscates the original MAC source address M1.

In addition, MAP 102(3) may pass the actual MAC address of wireless client 106(1) (e.g., MAC address M1) along backhaul links L1 and L2 to WLC 104 using an encrypted control traffic exchange between the MAP and the WLC, e.g., using encapsulation and encryption via a CAPWAP tunnel.

MAP 102(2) receives the backhaul frame transmitted over backhaul link L1. Upon receiving the backhaul frame (as an ingress frame), at 204, MAP 102(2) generates a random MAC source address RAND2-M1 for/to replace MAC source address RAND1-M1. MAP 102(2) maintains a dynamic mapping table T2 having entries that map MAC source addresses (from ingress traffic) to their corresponding ObMAC source addresses (used for egress traffic). Accordingly, MAP 102(2) stores an upstream MAC source address mapping (RAND1-M1)-(RAND2-M1) in a first entry of table T2.

MAP 102(2) replaces MAC source address RAND1-M1 carried in the (ingress) backhaul frame with random MAC source address RAND2-M1 to create a frame (i.e., a decapsulated client traffic frame) for egress that includes MAC source address RAND2-M1 and MAC destination address M2. Based on the MAC destination address M2, MAP 102(2) transmits the frame to wireless client 106(2). In the frame, MAC source address RAND2-M1 represents but obfuscates the original MAC source address M1. Upon receiving the frame, wireless client 106(2) records MAC source address RAND2-M1 as the last used ObMAC source address corresponding to wireless client 106(1).

Obfuscation operations performed by mesh network 100 on client traffic flowing in the downstream or reverse direction is now described. In the downstream direction, the MAC source and destination addresses are switch or reversed relative to the upstream direction. Initially, wireless client 106(2) transmits the client traffic destined for wireless client 106(1) directly to first hop MAP 102(3). The client traffic includes (i) a MAC source address=M2 (for wireless client 106(2)), and (ii) a MAC destination address set to the last ObMAC source address (RAND2-M1) used for client traffic in the upstream direction, as previously received by wireless client 106(2).

Upon receiving the client traffic (as ingress traffic), at 206, for the MAC source address, MAP 102(2) generates a random MAC source address RAND1-M2 to be used to obfuscate MAC source address M2 on egress, and stores a downstream MAC source address mapping M2-(RAND1-M2) in a second entry of table T2. Additionally, for the MAC destination address, MAP 102(2) performs a reverse mapping on upstream MAC source address mapping (RAND1-M1)-to-(RAND2-M1) to translate the MAC destination address that is set to MAC source address RAND2-M1 (on ingress) back to MAC source address RAND1-M1 (for egress). Next, MAP 102(2) (i) replaces MAC source address M2 carried in the (ingress) client traffic with ObMAC address RAND1-M2, and (ii) replaces MAC destination address RAND2-M1 with reverse-mapped MAC source address RAND1-M1 to creates a backhaul frame for egress, which includes the following MAC addresses:
  a. SA=RAND1-M2.
  b. DA=RAND1-M1.
  c. TA=MAP address (e.g., for MAP 102(2)).
  d. RA=MAP address (e.g., for MAP 102(3)).

MAP 102(2) transmits the backhaul frame to MAP 102(3) over backhaul link L1.

Upon receiving the backhaul frame from backhaul link L1 as an ingress frame, at 208, for the MAC source address, MAP 102(3) generates a random MAC source address RAND2-M2 to replace MAC source address RAND1-M2, and stores a downstream MAC source address mapping (RAND1-M2)-(RAND2-M2) in a second entry of table T1. For the MAC destination address, MAP 102(3) performs a reverse mapping on upstream MAC source address mapping M1-(RAND1-M1) to translate the MAC destination address that is set to MAC source address RAND1-M1 (on ingress) back to MAC source address M1 (for egress).

Next, MAP 102(3) (i) replaces MAC source address RAND1-M2 carried in the (ingress) client traffic with ObMAC source address RAND2-M2, and (ii) replaces MAC destination address RAND1-M1 with reverse-mapped MAC destination address M1 to create a frame for egress (i.e., a decapsulated client traffic frame), that includes MAC source address RAND2-M2 and MAC destination address M1. MAP 102(3) transmits the frame to wireless client 106(1).

The above-described embodiment may be extended to cover wireless client roaming from a MAP to a new MAP. WLC 104 always uses the MAC address of the wireless client (i.e., the client MAC address), e.g., as received over a CAPWAP tunnel. The ObMAC source address will be used only by MAPs for backhaul transport to provide privacy. When the wireless client roams to the new MAP, and sends a re-association request to the new MAP, the new MAP passes the client MAC address to WLC 104 in an encrypted CAPWAP tunnel. This allows WLC 104 to identify the wireless client and pass to the new MAP a correct pairwise master key (PMK) for encryption operations, e.g., for use as described below. The new MAP uses another ObMAC source address to transmit client traffic received from the wireless client over a backhaul link to a next MAP, as described above.

In summary, in the mapping table embodiment described in connection with FIG. 2, each MAP acts as a real-time MAC source-address mapper on a hop-to-hop basis. When an incoming MAP to which a wireless client is associated receives upstream client traffic from the wireless client, the MAP translates a MAC source address in the wireless client traffic to a new random MAC source address, which becomes an ObMAC source address. Then, the MAP transmits a backhaul frame, in which the original MAC source address is replaced by the new random MAC source address to obfuscate the original MAC source address, to a next hop MAP over a backhaul link. The next hop MAP may also perform essentially the same operation on the ingress MAC source address (i.e., the ObMAC source address) received over the backhaul link, and so on along the mesh network. In this way, the MAC source address of the wireless client is randomized "on the fly," and each MAP maintains a dynamic mapping table for downstream or return path MAC address translations. Each time the mesh network determines that a client MAC address rotation is to be performed, the ingress MAP updates its dynamic mapping table, using a new ObMAC source address for the wireless client. In addition, to further protect the privacy of the wireless client, each MAP along the backhaul path of the mesh network can create a random change to the MAC source address, while maintaining its own dynamic mapping table (for a new ObMAC source address at each mesh node). Thus, the flow of client traffic can have a different and random ObMAC source address along each section of the mesh (backhaul) network.

In the backhaul frames, the MAP transmitter address and the MAP receiver address remain unchanged; however, the MAC source address of the wireless client (becoming the MAC destination address for downstream/return traffic) is randomly allocated on demand by each MAP. Thus, a MAP can map one or many random ObMAC source addresses to an actual wireless client or its peer. In a mesh with multiple hops, a peer MAC itself is originating traffic from another MAP, so it is also subject to the same mapping.

On the return path, each MAP performs an inverse mapping of a MAC destination address back to the corresponding MAC source address (i.e., using the mapping table in the MAP) for the next hop of the journey through the mesh network. Thus, even with a frequently changing MAC source address, Internet Protocol (IP) connectivity may be maintained.

Figure 3:
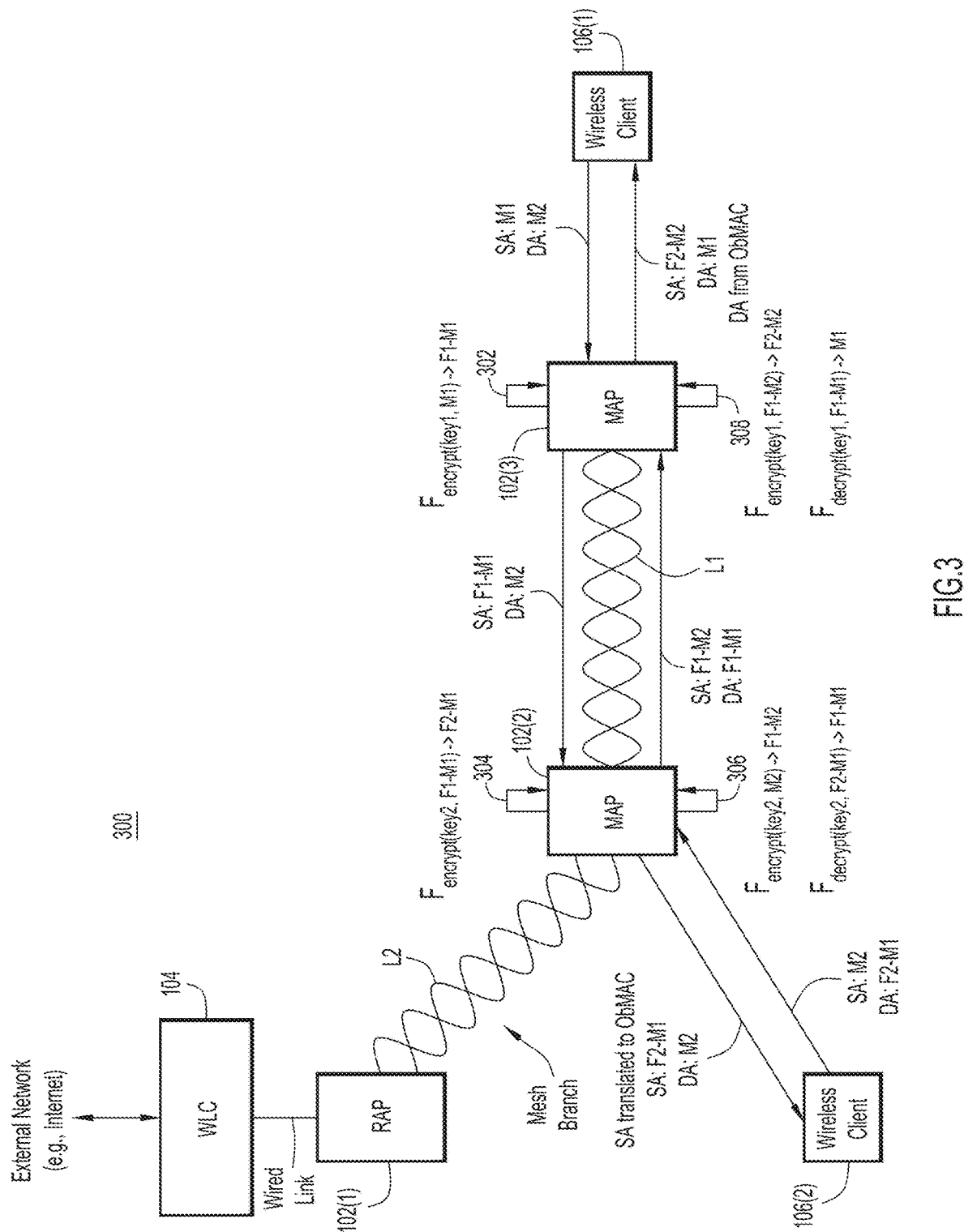
FIG. 3 is an illustration of a method of hop-by-hop randomization of a client MAC address using a mapping function (as opposed to the mapping tables of FIG. 2), performed in the mesh network, according to an example embodiment.

Another embodiment referred to as "hop-by-hop randomization of a client MAC (source) address using a mapping function" is now described in connection with FIG. 3. More specifically, FIG. 3 is an illustration of a method 300 of hop-by-hop randomization of a client MAC (source) address using a mapping function, performed in mesh network 100. The embodiment of FIG. 3 replaces the mapping tables of FIG. 2 with the mapping function. The mapping function includes an encryption-decryption function (referred to simply as an "encryption function"). Thus, for upstream client traffic, each MAP encrypts the ingress MAC source address using an encryption function F and a respective encryption key, to produce an encrypted MAC source address as the new random MAC source address (i.e., as the ObMAC source address) to be used to obfuscate the MAC source address on egress. For downstream or return client traffic, each MAP encrypts the ingress MAC source address, and decrypts the ingress MAC destination address that is represented by the corresponding encrypted MAC source address that was used in the upstream direction. Using the encryption function, each MAP is able to perform Layer-2 (L2) translation by encryption and decryption, which generates (pseudo) random MAC source addresses. This remains fully L2 transparent, meaning that a MAP that does not support the mapping function is still able to forward an ingress backhaul frame as an egress backhaul frame, assuming the backhaul frames include standard MAC addresses.

To implement the encryption function, each MAP maintains a small set of prioritized seeds and local-only keys, which may be rotated periodically. The keys are not exchanged with any other MAPs. The translation from MAC source address→ObMAC source address is achieved by encrypting the MAC source address in the upstream direction. In the downstream direction, each MAP uses its prioritized set of seeds/keys to decrypt/translate back to the MAC destination address. For upstream/downstream exchanges, the latest seed/key is used to encrypt/translate the MAC source address in the upstream direction, automatically ensuring that the MAC destination address seen on downstream traffic will be decrypted using the latest seed/key. Using the mapping function eliminates a large mapping table. It also has the advantage of being easy to debug and observe during network troubleshooting scenarios.

Obfuscation of a MAC source address in the upstream direction is described first. Wireless client 106(1) transmits client traffic to MAP 102(3) in the upstream direction. The client traffic includes MAC source and destination addresses M1 and M2, respectively. Upon receiving the client traffic, at 302, MAP 102(3) encrypts MAC source address M1 using encryption function F and encryption key key1, to produce a first encrypted MAC source address F1-M1 as a first ObMAC source address. MAP 102(3) creates a backhaul frame for egress that includes first encrypted MAC source address F1-M1 as the MAC source address in place of MAC source address M1. Based on MAC destination address M2, MAP 102(3) transmits the backhaul frame to MAP 102(2) over backhaul link L1.

Upon receiving the backhaul frame from backhaul link L1, at 304, MAP 102(2) encrypts first encrypted MAC source address F1-M1 using encryption function F and encryption key key2, to produce a second encrypted MAC source address F2-M1 as a second ObMAC source address. MAP 102(3) creates a frame for egress that includes second encrypted MAC source address F2-M1 as the MAC source address in place of MAC source address M1 (and MAC source address F1-M1). Based on MAC destination address M2, MAP 102(2) transmits the frame to wireless client 106(2). Upon receiving the frame, wireless client 106(2) records second encrypted MAC source address F2-M1 as the last MAC source address used for wireless client 106(1) in the upstream traffic.

Processing of downstream or return client traffic is now described. Wireless client 106(2) transmits client traffic to MAP 102(2) in the downstream direction. The client traffic includes MAC source address M2 and a MAC destination address set to second encrypted MAC source address F2-M1 (which was the last hop encrypted MAC source address used for wireless client 106(1) in the upstream traffic). Upon receiving the client traffic from wireless client 106(2), at 306, MAP 102(2) encrypts MAC source address M2 using encryption function F and key key2, to produce encrypted MAC source address F1-M2. In addition, MAP 102(2) decrypts encrypted MAC source address F2-M1 (now being used as the MAC destination address) using encryption function F (for decryption) and encryption key key2, to recover encrypted MAC source address F1-M1. MAP 102(2) creates a backhaul frame for egress that includes encrypted MAC address F1-M2 as a MAC source address, and encrypted MAC source address F1-M1 as a MAC destination address. Based on the MAC destination address, MAP 102(2) transmits the backhaul frame to MAP 102(3) over backhaul link L1.

Upon receiving the backhaul frame from backhaul link L1, at 308, MAP 102(3) encrypts the MAC source address represented by encrypted MAC address F1-M2 using encryption function F and key key1, to produce encrypted MAC source address F2-M2. In addition, MAP 102(3) decrypts the MAC destination address represented by encrypted MAC source address F1-M1 using encryption function F (used for decryption) and encryption key key1, to recover MAC source address M1. MAP 102(3) creates a frame having a MAC source address represented by encrypted MAC source address F2-M2, and a MAC destination address represented by recovered MAC source address M1. Based on MAC destination address M1, MAP 102(3) transmits the frame to wireless client 106(1).

Yet another embodiment that uses a mesh session key encrypted MAC address is now described. In this embodiment, each MAP of a mesh network (e.g., mesh network 100) possesses a session key derived with all peer MAPs, including parent and child MAPs. The session key may be used to encrypt the MAC source address at each hop MAP (i.e., each recipient peer MAP), using the session key of the recipient peer MAP. Thus, only an intended peer MAP can understand the MAC source address and further encrypt it for a next hop. An advantage of this approach is that it avoids additional mapping and unique key derivation at each MAP.

Figure 4:
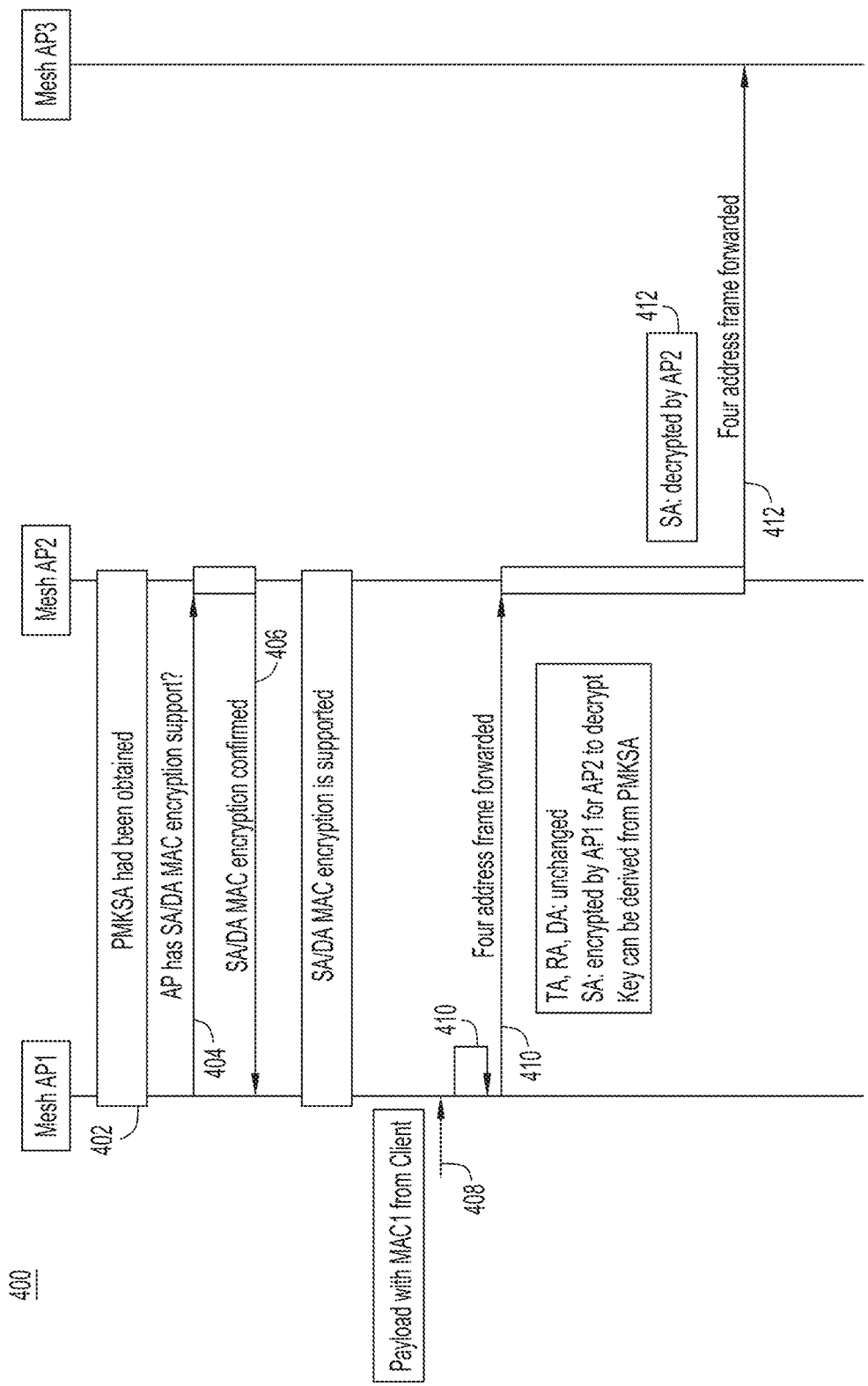
FIG. 4 is a transaction diagram of transactions used for obfuscation of the client MAC address based on a mesh session key to encrypt the client MAC address, according to an example embodiment.

With reference to FIG. 4, there is a transaction diagram of transactions 400 performed in a mesh network and used for MAC source address obfuscation based on a mesh session key to encrypt MAC addresses. The mesh network of FIG. 4 may include part of mesh network 100, and includes mesh APs AP1, AP2, and AP3.

At 402, mesh AP1 and mesh AP2 obtain a pairwise master key (PMK) security association (SA) (PMKSA). At 404, mesh AP1 queries mesh AP2 for confirmation that mesh AP2 has SA/DA encryption support (i.e., is configured to perform encryption and decryption of the SA/DA). At 406, mesh AP2 confirms to mesh AP1 that mesh AP2 has the SA/DA encryption support.

At 408, mesh AP1 receives ingress client traffic (i.e., a payload) from a wireless client. The payload includes MAC address MAC1 for the wireless client. At 410, mesh AP1 encrypts MAC1 using a key derived from the PMKSA, to produce an encrypted MAC1. Mesh AP1 creates a first backhaul frame (i.e., a four-address frame) for egress including MAC addresses DA, SA=encrypted MAC1 (using the PMKSA-derived key), TA, and RA. Mesh AP1 transmits the first backhaul frame to mesh AP2 over a backhaul link.

Upon receiving the first backhaul frame from the backhaul link, at 412, mesh AP2 decrypts MAC SA=encrypted MAC1 using a key derived from the PMKSA, to recover MAC1. Mesh AP2 creates a second backhaul frame including MAC addresses DA, SA (MAC1), TA, and RA, and transmits the second backhaul frame to mesh AP3 over a backhaul link.

Figure 5:
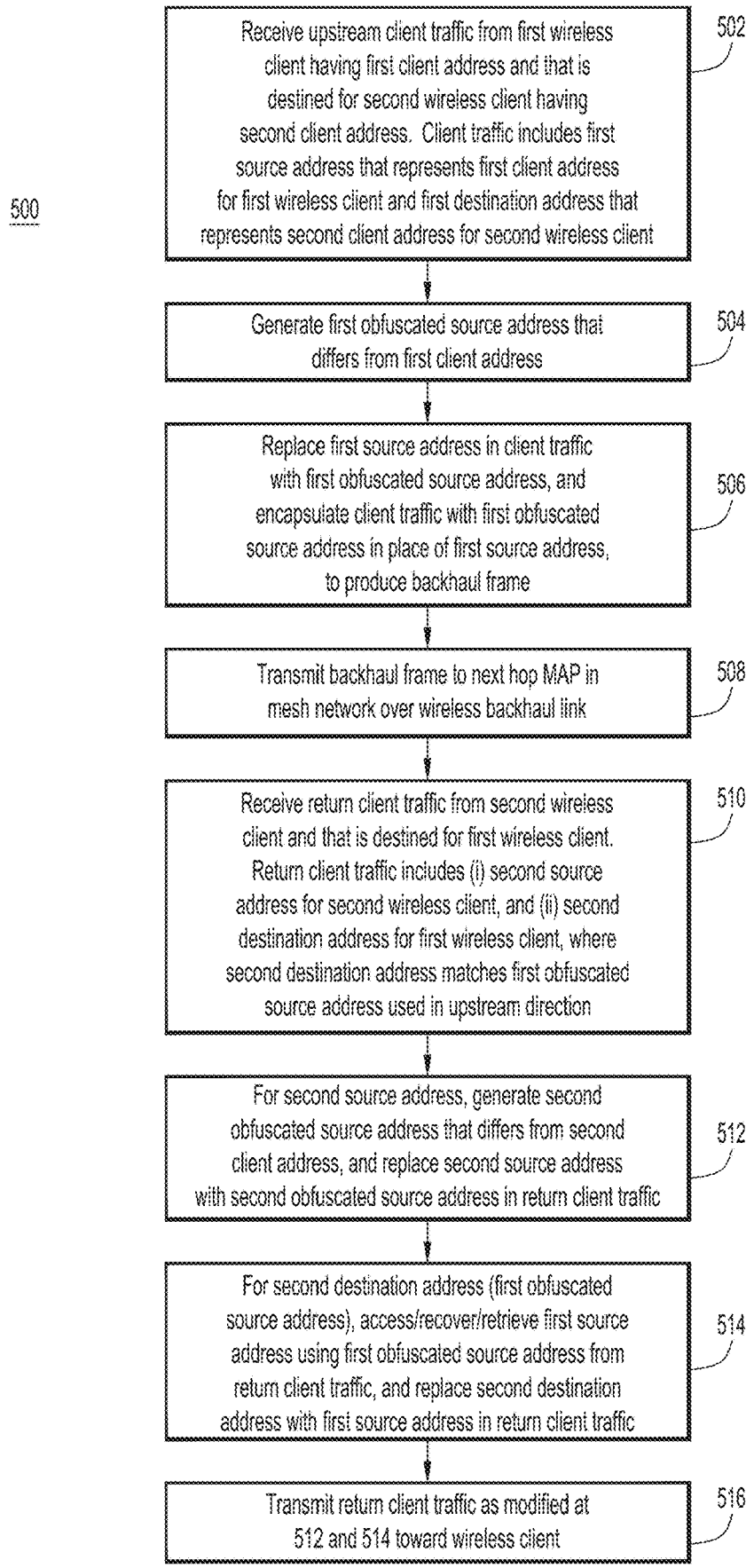
FIG. 5 is a flowchart of a method of obfuscating a client MAC address (used as a source address) performed by a MAP of the mesh network, according to an example embodiment.

With reference to FIG. 5, there is a flowchart of an example method 500 of obfuscating a MAC source address of a wireless client performed in mesh network 100. Method 500 may be performed primarily by a MAP (e.g., MAP 102(3) or MAP 102(2)) among the MAPs of the mesh network. The MAPs are configured to communicate with each other over wireless backhaul links. In the ensuing description of method 500, all of the addresses may be MAC addresses.

Operations 502-508 represent processing of upstream client traffic.

At 502, the MAP receives, from a first wireless client (e.g., 106(1)) having a first client address (e.g., a first client MAC address), (upstream) client traffic destined for a second wireless client (e.g., 106(2)) having a second client address (e.g., a second client MAC address). The client traffic includes a first source address (SA) that represents the first client address, and a first destination address (DA) that represents the second client address. When the MAP is a first hop MAP to which the first wireless client is attached, the first source address is the first client address.

At 504, upon receiving the client traffic, the MAP generates a first obfuscated source address that differs from the first source address and the first client address. The MAP may generate a random source address as the obfuscated source address and store a mapping of the first source address to the first obfuscated source address, or may encrypt the first source address with an encryption key to produce the first obfuscated source address.

At 506, the MAP replaces the first source address in the client traffic with the first obfuscated source address to obfuscate the first client address (and the first source address) of the first wireless client in the client traffic, i.e., the MAP modifies the client traffic in this way. The MAP encapsulates the client traffic as modified with the first obfuscated source address in place of the first client address/first source address, to produce a backhaul frame.

At 508, based on the first destination address, the MAP transmits the backhaul frame to a next MAP in the mesh network over a wireless backhaul link for subsequent forwarding by the mesh network (i.e., the next MAP and any other upstream MAPs) to the second wireless client based on the first destination address. The upstream MAPs may each repeat operations 504-508 to further obfuscate the first client address.

Operations 510-516 represent processing of downstream (return) client traffic.

At 510, the MAP receives, from the next MAP over the wireless backhaul link, return (downstream) client traffic originated by the second wireless client and that is destined for the first wireless client. The return client traffic includes a second source address that represents the second client address of the second wireless client, and a second destination address for the first wireless client that is/matches the first obfuscated source address used previously as an upstream source address. Upon receiving the return client traffic, the MAP performs next operations 512-516

With respect to the second source address, at 512, the MAP generates a second obfuscated source address that differs from the second client address (and the second source address), and replaces the second source address with the second obfuscated source address in the return client traffic.

With respect to the second destination address that is the first obfuscated source address, at 514, the MAP accesses/recovers/retrieves the first source address using the first obfuscated source address from the return client traffic. For example, the MAP may retrieve the first source address from the mapping (that was stored at 504, prior to when the MAC received the return client traffic) based on the first obfuscated source address, or decrypt the first obfuscated source address using the encryption key to recover the first source address. The MAP replaces the second destination address with the first source address.

At 516, the MAP transmits the return client traffic as modified at 512 and 514 toward the first wireless client (either directly or via a downstream next hop MAP depending on whether the MAP is connected directly to the first wireless client) based on the first source address now being used as the second destination address.

By way of example, the embodiments herein have been the described in the context of using MAC addresses to represent wireless client devices and obfuscating the MAC addresses. It is understood that the embodiments also apply to using other types of device addresses or identifiers to represent the wireless client devices and obfuscating the other types of device addresses or identifiers.

Figure 6:
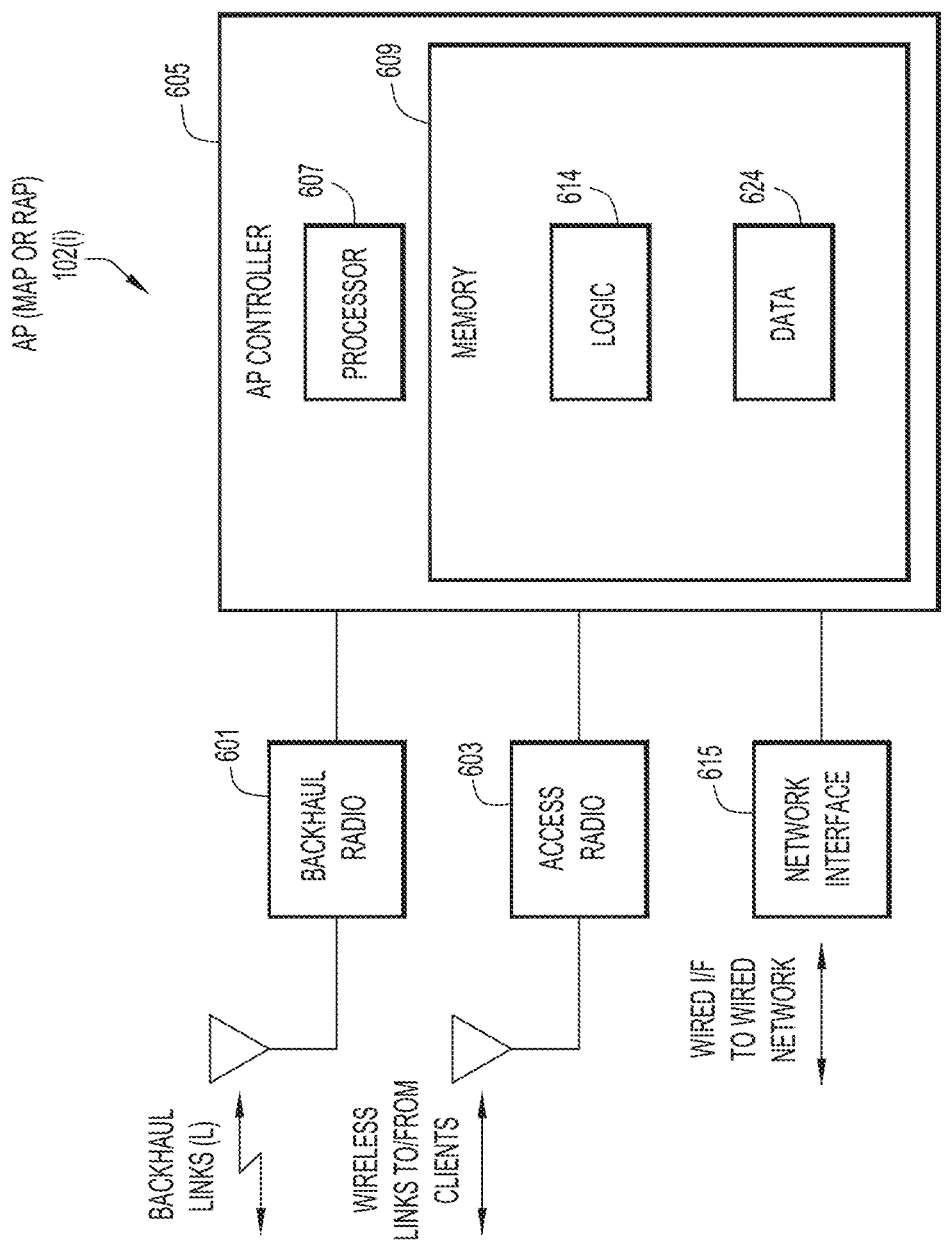
FIG. 6 is a block diagram of an example wireless access point (AP) of the mesh network, according to an example embodiment.

With reference to FIG. 6, there is shown a block diagram of an example AP 102(i) of mesh network 100 configured to perform operations according to embodiments presented herein. AP 102(i) may be configured as a RAP or a MAP. AP 102(i) includes a wireless backhaul radio 601 (also referred to a transmitter/receiver or "transceiver" 601) to support wireless backhaul links, a wireless access radio 603 to support access for wireless clients served by the AP, and an AP controller 605 to which the backhaul and access radios are coupled. In an embodiment, radios 601 and 603 are integrated into a single radio. Backhaul radio 601 may operate according to IEEE 802.11a in the approximately 5 GHz band, and access radio 603 may operative according to IEEE 802.11b/g in the approximately 2.4 GHz band, for example. Each radio includes a respective set of one or more antennas. AP 102(i) may include a wired network interface 615 that enables the AP to connect to a wired network and thereby operate as a root AP. Alternatively, AP 102(i) may operate as a mesh AP.

AP controller 605 includes a processor 607 and memory 609. Processor 607 is a microcontroller or microprocessor, for example, configured to execute software instructions stored in memory 609. Memory 609 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 609 may comprise one or more computer readable storage media (e.g., a memory device) encoded with software comprising computer executable instructions to implement logic 614 and when the software is executed (by processor 607) it is operable to perform the operations described herein. Memory 609 also stores information/data 624 used and generated by logic 614.

Figure 7:
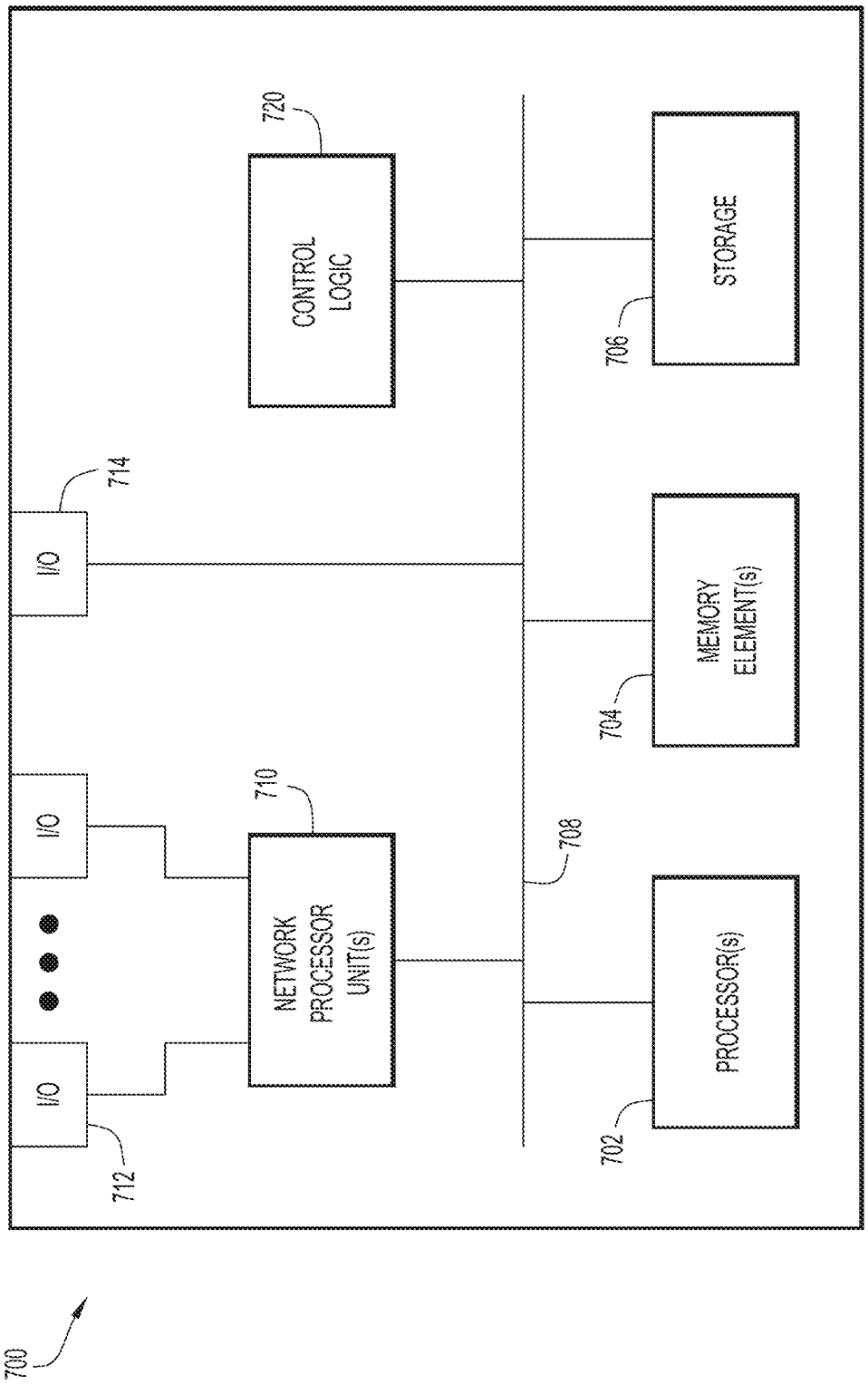
FIG. 7 is a hardware block diagram of a device that may perform functions associated with embodiments presented herein, according to an example embodiment.

FIG. 7 is a hardware block diagram of a device 700 that may perform functions associated with any of the operations discussed above, such as but not limited to any of the discussions of FIGS. 1-6. Device 700 may represent any of AP 102(i) and WLC 104. In at least one embodiment, the device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for device 700 can overlap in any manner and are not limited to the specific allocation of instructions and/or operations described herein.

In at least one embodiment, processor(s) 702 is/are at least one hardware processor configured to execute various tasks, operations and/or functions for device 700 as described herein according to software and/or instructions configured for device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with device 700, and/or logic configured for memory element(s) 704 and/or storage 706. For example, any logic described herein (e.g., control logic 720) can, in various embodiments, be stored for device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of device 700 to communicate in order to exchange information and/or data. Bus 708 can be implemented with any architecture designed for passing control, data and/or information between processors, memory elements/storage, peripheral devices, and/or any other hardware and/or software components that may be configured for device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between device 700 and other systems, devices, or entities, via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 700 and other systems, devices, or entities to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to device 700. For example, I/O interface(s) 714 may provide a connection to external devices such as a keyboard, keypad, a touch screen, and/or any other suitable input and/or output device now known or hereafter developed. This may be the case, in particular, when the device 700 serves as a user device described herein, for example, when the user device serves as the administrative portal to receive and display action messages described above. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 700 serves as a user device as described herein.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate and implement various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information or data frames) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any LAN, virtual LAN (VLAN), WAN (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), IEEE 802.11 (e.g., Wi-Fi®/Wi-Fi6®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm) wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'frame' may be used in a generic sense to include packets, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IPv4 and/or IPv6 addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 9) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

The methods presented herein may be embodied in a non-transitory computer readable storage medium comprising instructions that when executed configure one or more processors to perform the operations of the method.

In some aspects, the techniques described herein relate to a method including: at a mesh access point (MAP) among MAPs of a mesh network in which the MAPs are configured to communicate with each other over wireless backhaul links: receiving, from a first wireless client having a first client address, client traffic destined for a second wireless client having a second client address, the client traffic including a first source address that represents the first client address, and a first destination address that represents the second client address; generating a first obfuscated source address that differs from the first client address; replacing the first source address in the client traffic with the first obfuscated source address to obfuscate the first client address of the first wireless client in the client traffic; and transmitting the client traffic with the first obfuscated source address in place of the first source address to a next MAP of the MAPs over a wireless backhaul link for subsequent forwarding to the second wireless client.

In some aspects, the techniques described herein relate to a method, further including at the MAP: receiving, from the next MAP over the wireless backhaul link, return client traffic originated by the second wireless client and that is destined for the first wireless client, wherein the return client traffic includes a second destination address that is the first obfuscated source address; accessing the first source address based on the first obfuscated source address in the return client traffic, and replacing the first obfuscated source address of the second destination address in the return client traffic with the first source address provided by accessing; and transmitting the return client traffic with the first source address in place of the first obfuscated source address of the second destination address toward the first wireless client.

In some aspects, the techniques described herein relate to a method, further including at the MAP: prior to receiving the return client traffic, storing a mapping of the first source address to the first obfuscated source address, wherein accessing includes retrieving the first source address from the mapping using the first obfuscated source address.

In some aspects, the techniques described herein relate to a method, wherein: generating the first obfuscated source address includes encrypting the first source address using an encryption key to produce the first obfuscated source address as an encrypted address; and accessing includes decrypting the first obfuscated source address using the encryption key to recover the first source address.

In some aspects, the techniques described herein relate to a method, further including at the MAP: receiving, from the next MAP over the wireless backhaul link, return client traffic originated by the second wireless client and that is destined for the first wireless client, wherein the return client traffic includes a second source address that represents the second client address of the second wireless client; generating a second obfuscated source address that differs from the second client address; replacing, in the return client traffic, the second source address with the second obfuscated source address; and transmitting the return client traffic with the second obfuscated source address in place of the second source address toward the second wireless client.

In some aspects, the techniques described herein relate to a method, wherein: receiving includes receiving the client traffic directly from the first wireless client, such that the first source address is the first client address of the first wireless client.

In some aspects, the techniques described herein relate to a method, further including: encapsulating the client traffic that has the first obfuscated source address in place of the first source address with an address header to produce a backhaul frame, wherein the address header includes a source address that includes the first obfuscated source address, a destination address that includes the first destination address of the second wireless client, a MAP transmitter address, and a MAP receiver address, wherein transmitting includes transmitting the backhaul frame over the wireless backhaul link.

In some aspects, the techniques described herein relate to a method, wherein the first client address, the first source address, the first obfuscated source address, and the first destination address each represent a respective media access control (MAC) address.

In some aspects, the techniques described herein relate to a method, wherein generating includes generating a random address as the first obfuscated source address.

In some aspects, the techniques described herein relate to a method, wherein generating includes encrypting the first source address using an encryption function and an encryption key, to produce the first obfuscated source address.

In some aspects, the techniques described herein relate to an apparatus including: a radio to communicate over a wireless backhaul link; and a processor of a mesh access point (MAP) among MAPs of a mesh network in which the MAPs are configured to communicate with each other over wireless backhaul links, the processor being coupled to the radio and configured to perform: receiving, from a first wireless client having a first client address, client traffic destined for a second wireless client having a second client address, the client traffic including a first source address that represents the first client address, and a first destination address that represents the second client address; generating a first obfuscated source address that differs from the first client address; replacing the first source address in the client traffic with the first obfuscated source address to obfuscate the first client address of the first wireless client in the client traffic; and transmitting the client traffic with the first obfuscated source address in place of the first source address to a next MAP of the MAPs over the wireless backhaul link for subsequent forwarding to the second wireless client.

In some aspects, the techniques described herein relate to an apparatus, wherein the processor is further configured to perform: receiving, from the next MAP over the wireless backhaul link, return client traffic originated by the second wireless client and that is destined for the first wireless client, wherein the return client traffic includes a second destination address that is the first obfuscated source address; accessing the first source address based on the first obfuscated source address in the return client traffic, and replacing the first obfuscated source address of the second destination address in the return client traffic with the first source address provided by accessing; and transmitting the return client traffic with the first source address in place of the first obfuscated source address of the second destination address toward the first wireless client.

In some aspects, the techniques described herein relate to an apparatus, wherein the processor is further configured to perform: prior to receiving the return client traffic, storing a mapping of the first source address to the first obfuscated source address, wherein the processor is configured to perform accessing by retrieving the first source address from the mapping using the first obfuscated source address.

In some aspects, the techniques described herein relate to an apparatus, wherein: the processor is configured to perform generating the first obfuscated source address by encrypting the first source address using an encryption key to produce the first obfuscated source address as an encrypted address; and the processor is configured to perform accessing by decrypting the first obfuscated source address using the encryption key to recover the first source address.

In some aspects, the techniques described herein relate to an apparatus, wherein the processor is further configured to perform: receiving, from the next MAP over the wireless backhaul link, return client traffic originated by the second wireless client and that is destined for the first wireless client, wherein the return client traffic includes a second source address that represents the second client address of the second wireless client; generating a second obfuscated source address that differs from the second client address; replacing, in the return client traffic, the second source address with the second obfuscated source address; and transmitting the return client traffic with the second obfuscated source address in place of the second source address toward the second wireless client.

In some aspects, the techniques described herein relate to an apparatus, wherein the processor is further configured to perform: encapsulating the client traffic that has the first obfuscated source address in place of the first source address with an address header to produce a backhaul frame, wherein the address header includes a source address that includes the first obfuscated source address, a destination address that includes the first destination address of the second wireless client, a MAP transmitter address, and a MAP receiver address, wherein the processor is configured to perform transmitting by transmitting the backhaul frame over the wireless backhaul link.

In some aspects, the techniques described herein relate to a non-transitory computer readable medium encoded with instructions that, when executed by a processor of a mesh access point (MAP) among MAPs of a mesh network in which the MAPs are configured to communicate with each other over wireless backhaul links, cause the processor perform: receiving, from a first wireless client having a first client address, client traffic destined for a second wireless client having a second client address, the client traffic including a first source address that represents the first client address, and a first destination address that represents the second client address; generating a first obfuscated source address that differs from the first client address; replacing the first source address in the client traffic with the first obfuscated source address to obfuscate the first client address of the first wireless client in the client traffic; and transmitting the client traffic with the first obfuscated source address in place of the first source address to a next MAP of the MAPs over a wireless backhaul link for subsequent forwarding to the second wireless client.

In some aspects, the techniques described herein relate to a non-transitory computer readable medium, further including instructions to cause the processor to perform: receiving, from the next MAP over the wireless backhaul link, return client traffic originated by the second wireless client and that is destined for the first wireless client, wherein the return client traffic includes a second destination address that is the first obfuscated source address; accessing the first source address based on the first obfuscated source address in the return client traffic, and replacing the first obfuscated source address of the second destination address in the return client traffic with the first source address provided by accessing; and transmitting the return client traffic with the first source address in place of the first obfuscated source address of the second destination address toward the first wireless client.

In some aspects, the techniques described herein relate to a non-transitory computer readable medium, further including instructions to cause the processor to perform: prior to receiving the return client traffic, storing a mapping of the first source address to the first obfuscated source address, wherein the instructions to cause the processor to perform accessing include instructions to cause the processor to perform retrieving the first source address from the mapping using the first obfuscated source address.

In some aspects, the techniques described herein relate to a non-transitory computer readable medium, further including instructions to cause the processor to perform: receiving, from the next MAP over the wireless backhaul link, return client traffic originated by the second wireless client and that is destined for the first wireless client, wherein the return client traffic includes a second source address that represents the second client address of the second wireless client; generating a second obfuscated source address that differs from the second client address; replacing, in the return client traffic, the second source address with the second obfuscated source address; and transmitting the return client traffic with the second obfuscated source address in place of the second source address toward the second wireless client.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    at a mesh access point (MAP) among MAPs of a mesh network in which the MAPs are configured to communicate with each other over wireless backhaul links:
        receiving, from a first wireless client having a first client address, client traffic destined for a second wireless client having a second client address, the client traffic including a first source address that represents the first client address, and a first destination address that represents the second client address;
        generating a first obfuscated source address as a random address that differs from the first client address;
        storing a mapping between the first source address and the first obfuscated source address;
        replacing the first source address in the client traffic with the first obfuscated source address to obfuscate the first client address of the first wireless client in the client traffic, wherein the first client address, the first source address, the first obfuscated source address, and the first destination address each represent a respective media access control (MAC) address;
        transmitting the client traffic with the first obfuscated source address in place of the first source address to a next MAP of the MAPs over a wireless backhaul link for subsequent forwarding to the second wireless client; and
        upon receiving return client traffic originated by the second wireless client and that is destined for the first wireless client, replacing the first obfuscated source address in the return client traffic with the first source address using the mapping, and transmitting the return client traffic to the first wireless client.

2. The method of claim 1, further comprising at the MAP:
    receiving the return client traffic by receiving, from the next MAP over the wireless backhaul link, the return client traffic to include a second destination address that is the first obfuscated source address;
    accessing the first source address based on the first obfuscated source address in the return client traffic, and replacing the first obfuscated source address of the second destination address in the return client traffic with the first source address provided by accessing; and
    transmitting the return client traffic with the first source address in place of the first obfuscated source address of the second destination address toward the first wireless client.

3. The method of claim 2, wherein:
    accessing includes retrieving the first source address from the mapping using the first obfuscated source address.

4. The method of claim 1, further comprising at the MAP:
    receiving the return client traffic by receiving, from the next MAP over the wireless backhaul link, the return client traffic to include a second source address that represents the second client address of the second wireless client;
    generating a second obfuscated source address that differs from the second client address;
    replacing, in the return client traffic, the second source address with the second obfuscated source address; and
    transmitting the return client traffic with the second obfuscated source address in place of the second source address toward the first wireless client.

5. The method of claim 1, wherein:
    receiving includes receiving the client traffic directly from the first wireless client, such that the first source address is the first client address of the first wireless client.

6. The method of claim 1, further comprising:
    encapsulating the client traffic that has the first obfuscated source address in place of the first source address with an address header to produce a backhaul frame, wherein the address header includes a source address that includes the first obfuscated source address, a destination address that includes the first destination address of the second wireless client, a MAP transmitter address, and a MAP receiver address,
    wherein transmitting includes transmitting the backhaul frame over the wireless backhaul link.

7. The method of claim 1, wherein generating includes generating the random address as a random MAC source address.

8. The method of claim 1, further comprising, by the MAP, communicating with a wireless local area network (WLAN) controller (WLC) via the mesh network.

9. The method of claim 6, wherein the MAP transmitter address is for the MAP and the MAP receiver address is for the next MAP.

10. A non-transitory computer readable medium encoded with instructions that, when executed by a processor of a mesh access point (MAP) among MAPs of a mesh network in which the MAPs are configured to communicate with each other over wireless backhaul links, cause the processor perform:

receiving, from a first wireless client having a first client address, client traffic destined for a second wireless client having a second client address, the client traffic including a first source address that represents the first client address, and a first destination address that represents the second client address;
generating a first obfuscated source address as a random address that differs from the first client address;
storing a mapping between the first source address and the first obfuscated source address;
replacing the first source address in the client traffic with the first obfuscated source address to obfuscate the first client address of the first wireless client in the client traffic, wherein the first client address, the first source address, the first obfuscated source address, and the first destination address each represent a respective media access control (MAC) address;
transmitting the client traffic with the first obfuscated source address in place of the first source address to a next MAP of the MAPs over a wireless backhaul link for subsequent forwarding to the second wireless client; and
upon receiving return client traffic originated by the second wireless client and that is destined for the first wireless client, replacing the first obfuscated source address in the return client traffic with the first source address using the mapping, and transmitting the return client traffic to the first wireless client.

11. The non-transitory computer readable medium of claim 10, further comprising instructions to cause the processor to perform:
receiving the return client traffic by receiving, from the next MAP over the wireless backhaul link, the return client traffic to include a second destination address that is the first obfuscated source address;
accessing the first source address based on the first obfuscated source address in the return client traffic, and replacing the first obfuscated source address of the second destination address in the return client traffic with the first source address provided by accessing; and
transmitting the return client traffic with the first source address in place of the first obfuscated source address of the second destination address toward the first wireless client.

12. The non-transitory computer readable medium of claim 11 wherein:
the instructions to cause the processor to perform accessing include instructions to cause the processor to perform retrieving the first source address from the mapping using the first obfuscated source address.

13. The non-transitory computer readable medium of claim 10, further comprising instructions to cause the processor to perform:
receiving the return client traffic by receiving, from the next MAP over the wireless backhaul link, the return client traffic to include a second source address that represents the second client address of the second wireless client;
generating a second obfuscated source address that differs from the second client address;
replacing, in the return client traffic, the second source address with the second obfuscated source address; and
transmitting the return client traffic with the second obfuscated source address in place of the second source address toward the second wireless client.

14. The non-transitory computer readable medium of claim 10, further comprising instructions to cause the processor to perform communicating with a wireless local area network (WLAN) controller (WLC) via the mesh network.

15. An apparatus comprising:
a radio to communicate over a wireless backhaul link; and
a processor of a mesh access point (MAP) among MAPs of a mesh network in which the MAPs are configured to communicate with each other over wireless backhaul links, the processor being coupled to the radio and configured to perform:
receiving, from a first wireless client having a first client address, client traffic destined for a second wireless client having a second client address, the client traffic including a first source address that represents the first client address, and a first destination address that represents the second client address;
generating a first obfuscated source address as a random address that differs from the first client address;
storing a mapping between the first source address and the first obfuscated source address;
replacing the first source address in the client traffic with the first obfuscated source address to obfuscate the first client address of the first wireless client in the client traffic, wherein the first client address, the first source address, the first obfuscated source address, and the first destination address each represent a respective media access control (MAC) address;
transmitting the client traffic with the first obfuscated source address in place of the first source address to a next MAP of the MAPs over a wireless backhaul link for subsequent forwarding to the second wireless client; and
upon receiving return client traffic originated by the second wireless client and that is destined for the first wireless client, replacing the first obfuscated source address in the return client traffic with the first source address using the mapping, and transmitting the return client traffic to the first wireless client.

16. The apparatus of claim 15, wherein the processor is further configured to perform:
receiving the return client traffic by receiving, from the next MAP over the wireless backhaul link, the return client traffic, to include a second destination address that is the first obfuscated source address;
accessing the first source address based on the first obfuscated source address in the return client traffic, and replacing the first obfuscated source address of the second destination address in the return client traffic with the first source address provided by accessing; and
transmitting the return client traffic with the first source address in place of the first obfuscated source address of the second destination address toward the first wireless client.

17. The apparatus of claim 16, wherein:
the processor is configured to perform accessing by retrieving the first source address from the mapping using the first obfuscated source address.

18. The apparatus of claim 15, wherein the processor is further configured to perform:
receiving the return client traffic by receiving, from the next MAP over the wireless backhaul link to include a second source address that represents the second client address of the second wireless client;
generating a second obfuscated source address that differs from the second client address;

replacing, in the return client traffic, the second source address with the second obfuscated source address; and transmitting the return client traffic with the second obfuscated source address in place of the second source address toward the first wireless client.

19. The apparatus of claim 15, wherein:

the processor is configured to perform receiving by receiving the client traffic directly from the first wireless client, such that the first source address is the first client address of the first wireless client.

20. The apparatus of claim 15, wherein the processor is further configured to perform:

encapsulating the client traffic that has the first obfuscated source address in place of the first source address with an address header to produce a backhaul frame, wherein the address header includes a source address that includes the first obfuscated source address, a destination address that includes the first destination address of the second wireless client, a MAP transmitter address, and a MAP receiver address, wherein transmitting includes transmitting the backhaul frame over the wireless backhaul link.

\* \* \* \* \*